United States Patent [19]

Nikaido et al.

[11] Patent Number: 4,985,712

[45] Date of Patent: Jan. 15, 1991

[54] THERMAL HEAD

[75] Inventors: Masaru Nikaido, Miura; Katsuhisa Homma, Kawasaki; Tadayoshi Kinoshita, Machida, all of Japan

[73] Assignee: Kabushiki Kaisha Toshiba, Kawasaki, Japan

[21] Appl. No.: 426,865

[22] Filed: Oct. 26, 1989

[30] Foreign Application Priority Data

Oct. 31, 1988 [JP] Japan ................................ 63-272943

[51] Int. Cl.[5] ............................................ G01D 15/10

[52] U.S. Cl. ................................................ 346/76 PH

[58] Field of Search ............... 346/76 PH; 49/216 PH

[56] References Cited

FOREIGN PATENT DOCUMENTS

| | | | |
|---|---|---|---|
| 52-100245 | 8/1977 | Japan . | |
| 60-9770 | 1/1985 | Japan . | |
| 62-3968 | 1/1987 | Japan . | |
| 0090260 | 4/1987 | Japan | 346/76 PH |
| 2179007 | 2/1987 | United Kingdom | 346/76 PH |

*Primary Examiner*—Bruce A. Reynolds

*Assistant Examiner*—Huan Tran

*Attorney, Agent, or Firm*—Cushman, Darby & Cushman

[57] ABSTRACT

A thermal head of this invention has an improved protective layer on the head surface. The protective layer comprises a compound containing Si, O, N, and a metal M (wherein M is at least one metal selected from the group consisting of Zr, Mg, and Y). The protective layer has high hardness and toughness and does not deform much nor crack if a local concentrated load acts on it during operation of the thermal head. In the thermal head of this invention, the protective layer and a high-resistance substrate comprises a material having high hardness such as a metal, an alloy, or a ceramic protect various interlayers formed therebetween. Even if a layer comprising a material having low hardness such as a heat insulating layer comprising a heat-resistant resin is included as an interlayer, deformation or a crack caused by a local stress acting on the thermal head can be prevented. The protective layer can be produced at a higher sputtering rate than that of a conventional SIALON film or the like and therefore is superior in a mass-production property.

9 Claims, 1 Drawing Sheet

THERMAL HEAD

BACKGROUND OF THE INVENTION

1. Field of the Invention

The present invention relates to a thermal head and, more particularly, to an improvement in a protective layer of the thermal head.

2. Description of the Related Art

In recent years, a thermal head has been widely used in various recording devices such as a facsimile device and a word processor printer since the thermal head has advantages of noiseless, no need of maintenance, and a low running cost. Since such a recording device is required to be more compact, less expensive, and consume less power, a compact, inexpensive, and high-performance thermal head is also desired.

In order to satisfy the above requirements, Japanese Patent Disclosure (KOKAI) No. 52-100245 discloses a method in which a resin having a small thermal conductivity such as a polyimide resin or an epoxy resin is used as a heat insulating layer instead of conventional glazed glass. Since these resins have a low thermal diffusivity, the thermal heads using the resins have a high efficiency and can be easily bent to realize a compact size. A thermal head using such a polyimide resin as a heat insulating layer, however, cannot perform a stable printing operation for a long time period. The reasons for this are as follows. First, no polyimide resin having a sufficient heat resistance against an operation temperature of a thermal head can be obtained. Second, no sufficient adhesion between a resin and a substrate and between the resin and a thin film formed on the resin can be obtained not only under the static condition but also under the one of the repeated thermal stress.

The present inventors, however, have recently developed a siloxane-modified aromatic polyimide resin having a molecular structure represented by formula (1) as a material of a heat insulating layer so that a thermal head using a resin as a heat insulating layer can be put into practical use.

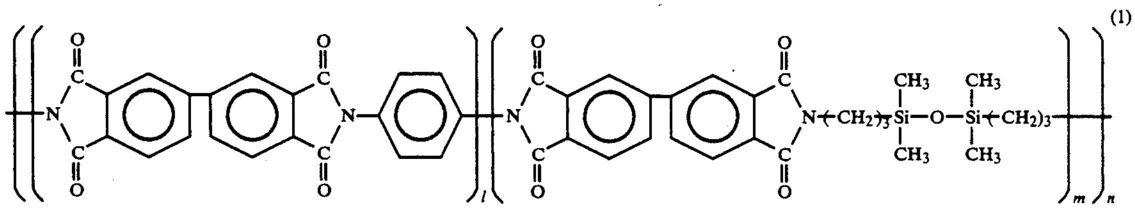

(1)

A detailed structure of a thermal head of this type will be described below with reference to FIG. 1. Referring to FIG. 1, reference numeral 1 denotes a metal substrate consisting of, e.g., an Fe-Cr alloy; and 2, a layer consisting of a polyimide resin represented by (formula 1). The polyimide resin layer 2 is obtained by coating and baking polyamic acid on the metal substrate 1. Polyamic acid is synthesized by substituting 0.05 to 10 mol % of p-phenylene diamine by bisaminosiloxane upon ring-opening poly-addition reaction of an equimolar mixture of a biphenyl tetracarboxylic acid dihydride and p-phenylene diamine. Reference numeral 3 denotes an undercoating layer consisting of, e.g., $SiO_x$, SiN, or SiC. The undercoating layer 3 is formed in order to protect the polyimide resin layer against chemical dry etching or ashing, facilitate control of a resistance upon formation of a heat-generating resistive layer 4, and improve a wire bonding property. Reference numeral 4 denotes a heat-generating resistor consisting of, e.g., Ta-$SiO_2$ or Ti-$SiO_2$. Discrete electrodes 6 and a common electrode 7 consisting of, e.g., Al or Al-Si-Cu are formed on the heat-generating resistor 4 so as to form an opening to serve as a heat-generating portion 5. A protective layer 8 consisting of, e.g., Si—O—N, SiN, or SiC is formed so as to cover at least the heat-generating portion 5. The protective layer 8 is illustrated as a single layer in FIG. 1. In an actual structure, however, a plurality of layers, such as an oxidation-proofing layer and an abrasion-proofing layer may be formed independently from each other, or an oxidation-proofing/abrasion proofing layer and an adhesive layer may be formed.

It is confirmed that such a thermal head can sufficiently withstand an operation as a thermal head in terms of a heat-resistance and an adhesive force. When this thermal head is incorporated in a device such as a facsimile device to perform a running test, however, a resistance abnormally changes to adversely affect a printing performance during the test. A singular point of a function at which the resistance abnormally changes as described above was carefully checked. As a result, it is found that hard foreign matters such as dust caught between the thermal head and heat-sensitive paper often causes a crack in the protective film, and the singular point of a function is produced when the crack reaches the heat-generating resistor. In addition, it is found that when a conventional high-resistance substrate obtained by forming glazed glass on $Al_2O_3$ or a high-resistance substrate obtained by forming a glass layer on a metal substrate is used, the above phenomenon does not occur even if the other arrangements are the same. That is, it is found that this phenomenon particularly occurs when a resin is used as the heat insulating layer. It is assumed that the phenomenon occurs because a heat insulating layer consisting of glass having high hardness does not deform much upon operation of a thermal head while a heat insulating layer consisting of a resin largely deforms because a resin is soft. That is, when a concentrated load is locally applied on a thermal head, deformation of the surface protective layer is smaller than that of the resin layer. Therefore, the protective layer cannot follow the deformation of the resin layer and cracks.

Various materials, therefore, have been examined as the surface protective layer. However, $Ta_2O_3$ or $SiO_2$, for example, is unsatisfactory in hardness, and $Si_3N_4$, SiC, and $Al_2O_3$ is unsatisfactory in toughness, and materials of both these types produce cracks. That is, none of the material has sufficient properties to be used in the thermal head using a resin for the heat insulating layer. Of these various materials, an example of a material not producing a crack is a SIALON film described in Japanese Patent Disclosure (KOKAI) Nos. 60-4077 and 62-3968. This SIALON film consists of Si, Al, O, and N as main components and has high hardness and toughness. A sputtering rate, however, upon formation of the SIALON film is low even in an Ar gas atmosphere. In addition, in this atmosphere, metal Al tends to precipitate to degrade an insulation property. Although this precipitation can be suppressed by adding 5% to 10% of $O_2$ or $N_2$ to the Ar gas, the sputtering rate is further decreased by this addition.

SUMMARY OF THE INVENTION

It is an object of the present invention to provide a thermal head having a protective layer which has high hardness, toughness and a superior mass-production property.

According to the present invention, there is provided a thermal head which comprises a high-resistance substrate, a heat-generating resistive layer formed on the high-resistance substrate, an electrode layer formed on the high-resistance substrate so as to be electrically connected to the heat-generating resistive layer, and a protective layer formed to cover at least a heat-generating portion of the heat-generating resistive layer.

This protective layer consists of a compound containing Si, O, N, and a metal M (which is at least one metal selected from the group consisting of Zr, Mg, and Y). Since the protective layer has high hardness and toughness, even if a local concentrated load acts on the protective layer during operation of the thermal head, the protective layer does not plastically deform much nor crack. By using this protective layer, therefore, even if a heat insulating layer consisting of a soft material having high deformability such as a heat-resistant resin is included as an interlayer between the high-resistance substrate and the heat-generating resistive layer, since the protective layer has sufficient hardness for resisting deformation caused when a hard foreign matter is cought in and toughness which prevents a crack from being easily formed upon deformation to a certain extent, deformation, a crack, and the like caused by a local stress of the thermal head can be prevented. When this thermal head is used, reliability can be improved without degrading a printing performance. In addition, this protective layer can be formed at a higher sputtering rate than that of a conventional SIALON film and the like and is superior in a mass-production property.

DETAILED DESCRIPTION OF THE PREFERRED EMBODIMENTS

The present invention will be described in detail below with reference to the accompanying drawing.

Figure 1:
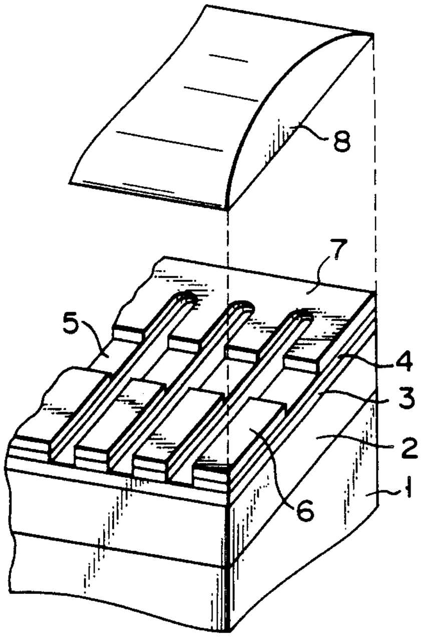
FIG. 1 is a perspective view showing a structure of a conventional thermal head.
Figure 2:
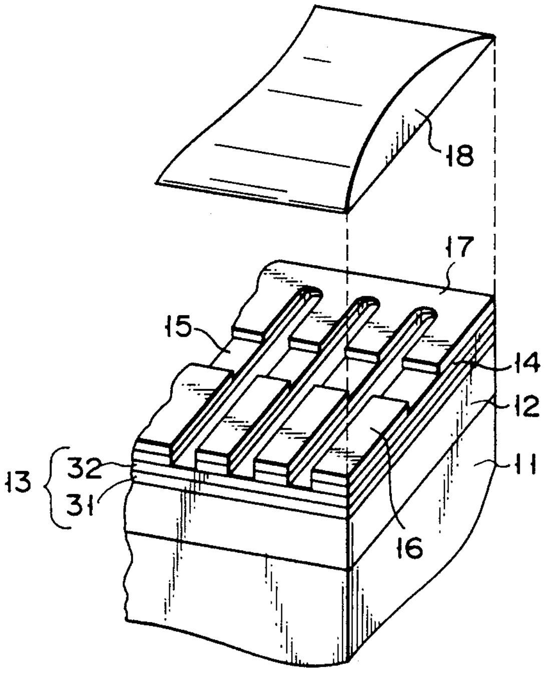
FIG. 2 is a perspective view showing a thermal head according to an embodiment of the present invention.

As shown in FIG. 2, in a thermal head of the present invention, an Fe—Cr alloy, for example, is used as a metal substrate 11. As the substrate, alloys containing, e.g., Al and Si in addition to Fe-Cr, and ceramics such as $Al_2O_3$ can also be used. A heat insulating layer 12 consisting of an aromatic polyimide resin represented by formula 1 below and having a thickness of about 5 to 50 μm, and preferably, 10 to 30 μm is formed as a heat insulating layer on the metal substrate 11.

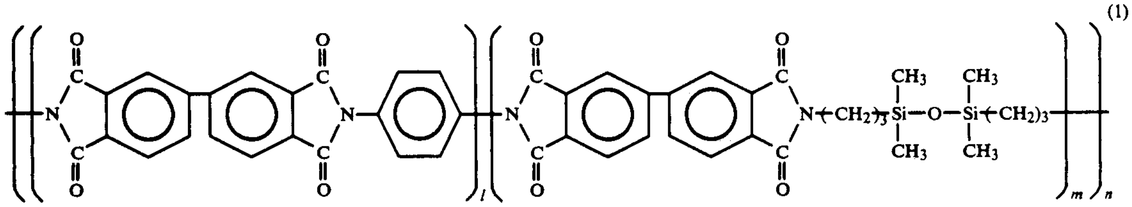
(1)

This polyimide resin is formed by coating and baking a polyamic acid varnish on the substrate 11. The polyamic acid varnish is prepared by substituting 5 mol % of p-phenylene diamine by bis-aminosiloxane to synthesize polyamic acid upon-ring opening poly-addition reaction of an equimolar mixture of, e.g., a biphenyl tetracarboxylic acid dihydride and p-phenylene diamine, and dissolving the obtained polyamic acid in an organic solvent. In addition to the polyimide resin, a polyamide resin, a polyamidoimide resin, a silicone resin, and the like can be used as the heat insulating layer 12. Although glazed glass can be used in place of the heat-resistant resin as a heat insulating layer 12, the substrate 11 and the heat insulating layer 12 are preferably a combination of a metal and a heat-resistant resin layer.

An undercoating layer 13 constituted by two layers of an SiN layer 31 and an SiC layer 32 having a thickness of 1 to 5 μm, and preferably, 2 to 4 μm is formed on the heat insulating layer 12 by, e.g., a plasma CVD method. The undercoating layer 13 is preferably constituted by at least one material selected from the group consisting of $SiO_x$, SiON, SiN, SiC, and I-carbon.

A heat-generating resistor 14 consisting of, e.g., Ta-$SiO_2$ is formed on the undercoating layer 13, and discrete electrodes 16 and a common electrode 17 consisting of, e.g., Al are formed on the element 14. Heat-generating portions 15 are that parts of the heat-generating resistor 14 which are located between both the electrodes. A protective layer 18 consisting of a compound containing, e.g., Si, Zr, Y, N, and O is formed to cover the heat-generating portion 15, thereby completing the thermal head.

In this thermal head when a pulse voltage is applied between the discrete and common electrodes 16 and 17 at a predetermined time interval, the heat-generating resistor 14 of the heat-generating portion 15 generates heat, thereby performing printing/recording.

The present invention improves the protective film 18 of the thermal head. The film 18 consists of a compound containing Si, O, N, and a metal M (which is at least one metal selected from the group consisting of Zr, Mg, and Y). In addition, the film 18 preferably consists of a compound containing Si, O, N, Zr, and Y.

In the compound, an amount of Zr is preferably 1.0 to 40 mol % calculated in terms of $ZrO_2$. If the amount is less than 1.0 mol %, no sufficient hardness nor toughness can be obtained. If the amount exceeds 40 mol %, a large amount of a metal component is contained to degrade an insulation property of the protective layer.

An amount of Y is preferably 0.1 to 10 mol % calculated in terms of $Y_2O_3$. If the amount is less than 0.1 mol %, no sufficient hardness nor toughness can be obtained. If the amount exceeds 10 mol %, a large amount of a metal component is contained to degrade the insulation property of the protective layer. An amount of Mg is preferably 0.1 to 10 mol % calculated in terms of MgO. If the amount is less than 0.1 mol %, no sufficient hardness nor toughness can be obtained. If the amount exceeds 10 mol %, a large amount of a metal component is contained to degrade the insulation property of the protective layer.

The protective film 18 according to the present invention has higher hardness and toughness than those of a conventional protective film. For example, in a conventional SIALON film, Al in the SIALON film properly disperses in the film as a metal component, thereby increasing the toughness. In the protective film according to the present invention, however, the hardness is increased since Zr and Y atoms bonded to N and O atoms are many as compared with Al atoms in SIALON, while a reduction in insulation property of the protective layer is small. In addition, when the protective film is to be formed in an Ar gas atmosphere by sputtering, a sputtering rate of the protective film according to the present invention is higher than that of the SIALON film and therefore is superior in a mass-production property.

The thermal head of the present invention shown in FIG. 2 is manufactured, e.g., as follows.

A metal substrate 11 consisting of an Fe alloy containing 18 wt % of Cr and having a thickness of about 0.5 mm is subjected to leveling, and cut into a predetermined size, and burr is removed therefrom. Thereafter, the metal substrate 11 is degreased/washed in an organic solvent, and dipped in diluted sulphuric acid maintained at 50° C. to 70° C. to remove an oxide layer formed on the surface and to perform an activation treatment to microscopically roughen the surface. Thereafter, the metal substrate 11 is washed with pure water and dried, and the above-described polyamic acid is adjusted to have a predetermined viscosity by using a solvent, e.g., N-methyl-2-pyrrolidone and coated on the metal substrate 11 to have a predetermined film thickness by using a roll coater, a spin coater, or the like. The resultant structure is heated in turn at 50° C. for one hour, at 80° C. for 30 minutes, at 120° C. for 30 minutes, at 250° C. for one hour, and at 450° C. for one hour by using a sintering furnace to remove a solvent component and to accelerate a dehydrating cyclizing reaction so as to perform film formation, thereby forming a heat insulating layer 12.

Thereafter, an undercoating layer 13 constituted by an SiN layer 31 and an SiC layer 32 is continuously formed on the heat insulating layer 12 at a substrate temperature of 150° C. to 300° C. by the plasma CVD method. That is, $SiH_4$ gas and $N_2$ gas are introduced to form the SiN layer 31, and then $SiH_4$ gas and $CH_4$ gas are introduced to form the SiC layer 32. Thereafter, a heat-generating resistor 14 consisting of Ta-$SiO_2$, and discrete electrodes 16 and a common electrode 17 consisting of Al are formed. Note that an opening serving to form a heat-generating portion 15 is obtained by forming an Al layer into a predetermined pattern by wet or dry etching after masking.

EXAMPLES

Targets having compositions as listed in Table 1 below were used to perform sputtering in an Ar gas atmosphere in which a background pressure was $1\times10^{-6}$ Torr and a pressure after Ar was introduced was $1\times10^{-3}$ Torr, at a substrate temperature of 150° C. to 200° C. for a predetermined time, thereby forming protective films each having a film thickness of 3 μm. Each protective film was subjected to hardness estimation using a micro knoop hardness tester for thin films and fracture strength measurement using a scratch tester having a sensor for sensing acoustic emission generated upon film breaking. In addition, the thermal heads having each protective film were assembled in facsimiles and operated, thereby performing a 10-km running test at a platen pressure of 160 g/cm and an application energy of 0.23 mJ/dot with a pulse width of 2.2 ms. The results are summarized in Table 1. Each layer thickness was 3 μm except for $SiO_2$ (2 μm)+$Ta_2O_5$ (3 μm) in comparative examples.

TABLE 1

| | Protective Film (Target Composition) | Knoop Hardness ($Kg/cm^2$) | Film Break-down Strength (N) | Number of Singular Points of Function After Running Test | Sputtering Rate (Å/hrs) |
|---|---|---|---|---|---|
| Example | | | | | |
| 1 | $Si_3N_4$:$ZrO_2$ (Balance:10 mol %) | 1530 | 22 | 0 | 5500 |
| 2 | $Si_3N_4$:$ZrO_2$:$Y_2O_3$ (Balance:10 mol %: 0.3 mol %) | 1500 | 25 | 0 | 5500 |
| 3 | $Si_3N_4$:$ZrO_2$:$Y_2O_3$:$Al_2O_3$ (Balance:10 mol %: 0.3 mol %:0.03 mol %) | 1500 | 25 | 0 | 5500 |
| 4 | $Si_3N_4$:$ZrO_2$ (Balance:20 mol %) | 1600 | 26 | 0 | 5500 |
| 5 | $Si_3N_4$:$ZrO_2$:$Y_2O_3$ (Balance:20 mol %: 0.3 mol %) | 1550 | 30 | 0 | 5500 |
| 6 | $Si_3N_4$:$ZrO_2$:$Y_2O_3$:MgO (Balance:20 mol %: 0.3 mol %:0.05 mol %) | 1550 | 30 | 0 | 5500 |
| Comparative Example | | | | | |
| 1 | $Si_3N_4$ only | 1600 | 12 | 17 | 6000 |
| 2 | $Si_3N_4$:$SiO_2$ (Balance:50 mol %) | 900 | 6 | 30 | 6000 |
| 3 | $SiO_2$ $Ta_2O_5$ | 400 | 15 | 75 | 4000 |

TABLE 1-continued

| | Protective Film (Target Composition) | Knoop Hardness ($Kg/cm^2$) | Film Break-down Strength (N) | Number of Singular Points of Function After Running Test | Sputtering Rate (Å/hrs) |
|---|---|---|---|---|---|
| | (100%) (100%) | | | | |
| 4 | Two Layers $Si_3N_4$:$Al_2O_3$ (Balance:10 mol %) | 1400 | 30 | 0 | 3800 |

As is apparent from Table 1, the protective layer according to the present invention has high hardness and toughness, can prevent a crack which tends to be produced when a resin is used as a heat insulating layer, can be produced at a high sputtering rate, and is superior in a mass-production property.

In the above embodiment, a metal substrate is used as a support. The present invention, however, is not limited to the above embodiment. For example, a ceramic substrate or the like can be used. In addition, even when glazed glass is used as a heat insulating layer, good results can be obtained.

What is claimed is:

1. A thermal head comprising:
   - a high-resistance substrate;
   - a heat-generating resistive layer formed on the high-resistance substrate;
   - electrode layers formed on the high-resistance substrate so as to be electrically connected to the heat-generating resistive layer; and
   - a protective layer formed to cover at least a heat-generating portion of the heat-generating resistive layer,
   - wherein the protective layer comprises a compound containing Si, O, N, ZR and a metal M (wherein M is at least one metal selected from the group consisting of Mg, and Y).

2. A thermal head according to claim 1, wherein the protective layer comprises a compound containing Si, O, N, Y, and Zr.

3. A thermal head according to claim 1, wherein the protective layer comprises a compound containing Si, O, N, and Zr, an addition amount of Zr in the compound being 1.0 to 40 mol % calculated in terms of $ZrO_2$.

4. A thermal head according to claim 1, wherein the protective layer comprises a compound containing Si, O, N, Zr and Y, an addition amount of Y in the compound being 0.1 to 10 mol % calculated in terms of $Y_2O_3$.

5. A thermal head according to claim 1, wherein the high-resistance substrate comprises one member selected from the group consisting of a metal, an alloy, and a ceramic.

6. A thermal head, comprising:
   - a high-resistance substrate;
   - a heat insulating layer comprising a heat-resistant resin formed on the high-resistance substrate;
   - a heat-generating resistive layer formed on the heat insulating layer;
   - electrode layers formed on the high-resistance substrate so as to be electrically connected to the heat-generating resistive layer; and
   - a protective layer formed to cover at least a heat-generating portion of the heat-generating resistive layer, wherein the protective layer comprises a compound containing Si, O, N, Zr and a metal M wherein M is at least one metal selected from the group consisting of Mg and Y).

7. A thermal head according to claim 6, wherein the high-resistance substrate comprises a metal.

8. A thermal head according to claim 6, wherein the high-resistance substrate comprises an alloy.

9. A thermal head according to claim 6, wherein the high-resistance substrate comprises a ceramic.

* * * * *